(12) United States Patent
Kim et al.

(10) Patent No.: US 12,510,806 B2
(45) Date of Patent: Dec. 30, 2025

(54) CAMERA ACTUATOR AND FOLDED ZOOM CAMERA MODULE COMPRISING SAME

(71) Applicant: JAHWA ELECTRONICS CO., LTD., Cheongju-si (KR)

(72) Inventors: Hee Seoung Kim, Seoul (KR); Kyu Min Lee, Bucheon-si (KR)

(73) Assignee: JAHWA ELECTRONICS CO., LTD., Cheongju-si (KR)

(*) Notice: Subject to any disclaimer, the term of this patent is extended or adjusted under 35 U.S.C. 154(b) by 144 days.

(21) Appl. No.: 18/530,902

(22) Filed: Dec. 6, 2023

(65) Prior Publication Data

US 2024/0126142 A1     Apr. 18, 2024

Related U.S. Application Data

(63) Continuation of application No. PCT/KR2022/008113, filed on Jun. 9, 2022.

(30) Foreign Application Priority Data

Jun. 9, 2021  (KR) .......... 10-2021-0075050

(51) Int. Cl.
  *G03B 13/36*  (2021.01)
  *G02B 13/00*  (2006.01)
  *G02B 27/64*  (2006.01)

(52) U.S. Cl.
  CPC ......... *G03B 13/36* (2013.01); *G02B 13/0065* (2013.01); *G02B 27/646* (2013.01)

(58) Field of Classification Search
  CPC . G03B 13/36; G03B 3/00; G03B 3/10; G03B 5/00; G03B 17/02; G02B 13/0065; G02B 27/646; H01F 7/02; H01F 7/0242; H02N 2/02
  See application file for complete search history.

(56) References Cited

U.S. PATENT DOCUMENTS

| | | | |
|---|---|---|---|
| 7,262,926 B2* | 8/2007 | Ohsato | G02B 7/102 359/822 |
| 11,835,736 B2* | 12/2023 | Umeda | G02B 7/026 |
| 2011/0199696 A1* | 8/2011 | Lee | G02B 7/08 310/323.16 |
| 2017/0371125 A1* | 12/2017 | Ninomiya | H02N 2/0065 |

FOREIGN PATENT DOCUMENTS

| | | |
|---|---|---|
| JP | 2000-019376 A | 1/2000 |
| JP | 2001-178161 A | 6/2001 |
| KR | 10-2008-0065968 A | 7/2008 |
| KR | 10-2008-0085571 A | 9/2008 |
| KR | 10-2017-0096949 A | 8/2017 |
| KR | 10-2018-0137278 A | 12/2018 |

* cited by examiner

*Primary Examiner* — Gevell V Selby
(74) *Attorney, Agent, or Firm* — Bridgeway IP Law Group, PLLC; Jihun Kim

(57) ABSTRACT

A camera actuator comprises: a housing; a driving unit which is loaded in the housing, and which includes a vibration generator generating vibration from an input power source and a shaft vibrating in a first direction by means of the vibration generated by the vibration generator; an optical unit, which implements zoom and auto focusing while being driven in the first direction in the housing by means of the vibration of the shaft; and a frictional movement unit for connecting the shaft and the optical unit to transfer the first directional vibration of the shaft to the optical unit.

11 Claims, 11 Drawing Sheets

CAMERA ACTUATOR AND FOLDED ZOOM CAMERA MODULE COMPRISING SAME

CROSS-REFERENCE TO RELATED APPLICATION

This application is a continuation application of the International Application No. PCT/KR2022/008113, filed on Jun. 9, 2022, which is incorporated herein by reference in its entirety, and additionally claims priority from Korean Patent Application No. 10-2021-0075050, filed on Jun. 9, 2021, which is also incorporated herein by reference in its entirety.

TECHNICAL FIELD

The present disclosure relates to a camera actuator, and more particularly, to a camera actuator applied to a folded zoom camera module to implement high-magnification optical zoom and auto-focusing, and a folded zoom camera module including the same.

BACKGROUND ART

Most camera modules mounted in mobile devices in the related art implement zoom and auto-focusing by moving optical systems including a plurality of lenses in an optical axis direction that is a direction in which light is introduced. In this case, a movement direction of the optical system is a thickness direction of the mobile device when the camera module is mounted in the mobile device. Therefore, in the related art, it is necessary to ensure a minimum space in which the optical system of the camera module may move in the thickness direction of the mobile device.

That is, most of the camera modules in the related art, which are each configured such that the optical system moves in the thickness direction of the mobile device, each require the minimum space ensured in the thickness direction of the mobile device to the extent that the camera module may be mounted in the mobile device at the time of mounting the camera module in the mobile device. For this reason, there is a structural limitation that makes it difficult to meet the requirements of the market in the recent trend toward slimmer and thinner mobile devices.

In order to solve the above-mentioned problem in the related art, attempts have been made to reduce a size of the optical system by adjusting an angle and size of the lens, a spacing interval between the lenses, a focal length, and the like. However, the primitive method of physically reducing a size of a zoom lens or zoom lens barrel has a limitation in slimness and cannot be an alternative because the method may degrade intrinsic characteristics of the zoom lens.

Therefore, there has been proposed a folded zoom camera module in which a reflection system is mounted to reflect light, which is introduced from the outside, at 90 degrees, and an optical system, which transmits light refracted from the reflection system, is laid down in a width or length direction of the mobile device to ensure a sufficient interval of the lenses constituting the optical system, thereby implementing high-magnification optical zoom and achieving slimness.

Unlike a structure in the related art in which sensors (image capturing elements such as a CCD and a CMOS) and lenses are stacked vertically, the folded zoom camera module adopts a periscope structure, thereby achieving high-magnification optical zoom without increasing an overall height. In addition, unlike the related art in which the lenses are stacked vertically, the periscope structure is advantageous in slimness of the module in comparison with the related art.

Meanwhile, key factors, which crucially affect zoom performance of the camera, include not only the specifications of the lens constituting the optical system but also a working range of the optical system. This is because improved zoom performance may be exhibited as the working range of the optical system increases. One of the drive mechanisms, which are applied to increase the working range of the optical system in the small-scale camera equipped with the zoom lens, is a stepping motor.

However, the stepping motor, which is applied to the folded zoom camera module in the related art, causes a problem in that an overall volume of the small-scale camera increases because of a size of the stepping motor. Because a space sufficient to mount the stepping motor is required because of the large volume of the stepping motor, the overall volume of the small-scale camera needs to be increased.

The stepping motor, which is applied as an optical system driving device to the folded zoom camera module in the related art as described above, is disadvantageous in miniaturizing the device. Therefore, as an alternative to the stepping motor in the related art, a piezoelectric method using a piezoelectric element has been recently in the limelight. The piezoelectric method uses vibration, which is generated when a high-frequency pulse voltage is applied to the piezoelectric element, to operate the optical system.

Because the piezoelectric method uses the piezoelectric element much smaller in size than the stepping motor in the related art, the piezoelectric method is advantageous in miniaturizing the camera module. In addition, because the piezoelectric element, which generates driving power, is much lighter in weight than the stepping motor in the related art, it is possible to reduce an overall weight of the camera module. That is, the piezoelectric method is advantageous in implementing small-scale, lightweight products in comparison with the method using the stepping motor in the related art.

FIG. 10 is a view schematically illustrating a piezoelectric optical system driving device in the related art.

With reference to FIG. 10, a piezoelectric optical system driving device 8 in the related art includes a piezoelectric element 80 and a shaft 82 fixed to one side of the piezoelectric element 80. A friction member 70, which is provided on a lateral portion of a lens barrel 7 constituting an optical system, is coupled to have a structure that surrounds a part of an outer surface of the shaft 82 in a circumferential direction, such that the friction member 70 is fixed to the shaft 82 by a frictional force between the friction member 70 and the shaft 82, and the friction member 70 moves along the shaft 82 when the shaft 82 is vibrated by the piezoelectric element 80.

More specifically, when the piezoelectric element 80 is quickly vibrated in a first direction (an axial direction of the shaft) by a high-frequency pulse voltage applied from the outside, the shaft 82 also vibrates while quickly extending and contracting repeatedly in the first direction. In this case, when the shaft 82 quickly moves in the extension direction and slowly moves in the contraction direction, the friction member 70 and the lens barrel 7 moves in the direction in which the shaft 82 contracts.

When the shaft 82 quickly extends, the friction member 70 and the lens barrel 7 do not move because of the tendency for the lens barrel 7 to remain in a stopped state (static inertia). However, a frictional force between the friction member 70 and the shaft 82 is higher than the static inertia in the contraction direction in which the shaft moves relatively slowly, such that the friction member 70 and the lens barrel 7 move together in the direction in which the shaft 82 contracts.

When the shaft 82 is vibrated in the first direction by the vibration generated by the piezoelectric element 80, a counteraction occurs on the piezoelectric element 80 because of an interaction (action and reaction) between the shaft 82 and the piezoelectric element 80. The counteraction of the piezoelectric element 80 is identical in magnitude the force applied to the shaft and different in direction from the force applied to the shaft. Therefore, when the counteraction is not suppressed, the intensity of the vibration applied to the shaft decreases, such that proper performance (optical zoom and auto-focusing) cannot be implemented.

Therefore, there has been adopted a configuration that suppresses the counteraction of the piezoelectric element by attaching a separate dummy 9, which corresponds to a kind of weight, to a distal end of the piezoelectric element, more specifically an end of the piezoelectric element 80, which is opposite to a portion connected to the shaft 82, as illustrated in FIG. 10, in the piezoelectric optical system driving device in the related art applied to the folded zoom camera module.

However, the method of attaching the dummy in the related art illustrated in FIG. 10 requires a mounting space in the camera module by a volume of the attached dummy, which makes it difficult to implement the camera module with a compact size. Further, there is a problem in that a center of gravity of the piezoelectric element is biased rearward by the dummy, and the shaft positioned opposite to the dummy is separated, and the optical axis direction is misaligned, which adversely affects the camera performance.

DISCLOSURE

Technical Problem

A technical object to be achieved by the present disclosure is to provide a camera actuator and a folded zoom camera module including the same, which are capable of effectively suppressing a counteraction of a vibration generator without a separate dummy, miniaturizing a camera module to a degree to which the dummy is eliminated, and stably exhibiting optical zoom and auto-focusing performance.

Technical Solution

As the technical solution, an embodiment of the present disclosure provides a camera actuator including: a housing; a driving unit mounted in the housing and including a vibration generator configured to generate vibration from input power, and a shaft configured to be vibrated in a first direction by the vibration generated by the vibration generator; an optical unit configured to implement zoom and auto-focusing while being operated in the first direction in the housing by the vibration of the shaft; and a frictional movement unit configured to connect the shaft and the optical unit to transmit the first direction vibration of the shaft to the optical unit, in which a counteraction suppression plate, which suppresses a counteraction of the vibration generator when the driving unit vibrates in the first direction, is installed on a sidewall of the housing perpendicular to a first direction axis, and in which a part of a distal end of the vibration generator opposite to the shaft is inserted into a binding groove of the sidewall on which the counteraction suppression plate is installed, such that the distal end of the vibration generator is fixed to have a structure being in close contact with the counteraction suppression plate.

The camera actuator of the embodiment of the present disclosure may further include: a ball guide part configured to support the optical unit so that the optical unit rolls in the first direction relative to the housing.

In the camera actuator according to the embodiment of the present disclosure, the driving unit may be provided as two or more driving units, and the optical unit and the frictional movement unit may be provided as two or more optical units and two or more frictional movement units so as to respectively correspond to the two or more driving units one by one.

In this case, the two or more optical units may be disposed in series at an interval in the first direction in the housing.

In particular, the driving units applied to the camera actuator according to the embodiment of the present disclosure may include a first driving unit and a second driving unit, a shaft of the first driving unit and a shaft of the second driving unit may be parallel to each other, and the vibration generators may be disposed to face each other in a diagonal direction based on the first direction axis passing through centers of the optical units.

In this case, the two or more optical units may be independently operated in the first direction by the driving units respectively corresponding to the optical units.

The ball guide part applied to the camera actuator according to the embodiment of the present disclosure may include: a pair of ball rails formed on an upper surface of a bottom portion of the housing and having first ball grooves continuously formed in the first direction; second ball grooves formed in the first direction in lower surfaces of the optical units while corresponding to the first ball grooves; and balls interposed between the first ball grooves and the second ball grooves corresponding to and facing one another.

In this case, a magnetic element may be mounted on a bottom portion of the housing, and a magnet may be mounted on the lower surface of the optical unit facing the bottom portion of the housing.

The counteraction suppression plate applied to the camera actuator according to the embodiment of the present disclosure may be made of a metallic material, and a distal end surface of the vibration generator may be in close contact with one surface of the counteraction suppression plate, thereby suppressing the counteraction of the vibration generator.

The vibration generator applied to the camera actuator according to the embodiment of the present disclosure may be a piezoelectric motor including a piezoelectric element.

In addition, the frictional movement unit applied to the camera actuator according to the embodiment of the present disclosure may include: a friction clamp disposed on the shaft and having a structure that surrounds a part of an outer surface of the shaft; and a clamp block attached to a lateral portion of the optical unit by means of a connection member and configured such that the friction clamp is mounted on the clamp block.

As the technical solution, another embodiment of the present disclosure provides a folded zoom camera module including: a camera actuator according to the embodiment; a reflection system disposed forward of the camera actuator based on a propagation direction of light and configured to reflect light, which is introduced from the outside, toward the camera actuator; and an image sensor unit disposed rearward of the camera actuator based on the propagation direction of light and configured to receive light having passed through the camera actuator and create and output image information corresponding to the received light.

Advantageous Effects

According to the camera actuator according to the embodiment of the present disclosure, the means (counteraction suppression plate) for suppressing the counteraction of the vibration generator has the plate-shaped structure and is installed on the sidewall of the actuator housing in the related art, thereby eliminating the effort to ensure a separate space (the effort to ensure an additional space for accommodating a dummy in the related art) and making the camera module more compact to the extent that the dummy having a predetermined volume is eliminated.

That is, it is possible to effectively suppress the counteraction of the vibration generator even without a separate dummy, miniaturize the camera module by eliminating the dummy, and stably exhibiting optical zoom and auto-focusing performance because there is no problem in that a center of gravity of the piezoelectric element is biased rearward by the dummy, and the shaft positioned opposite to the dummy is separated, and the optical axis direction is misaligned.

MODE FOR DISCLOSURE

Figure 1:
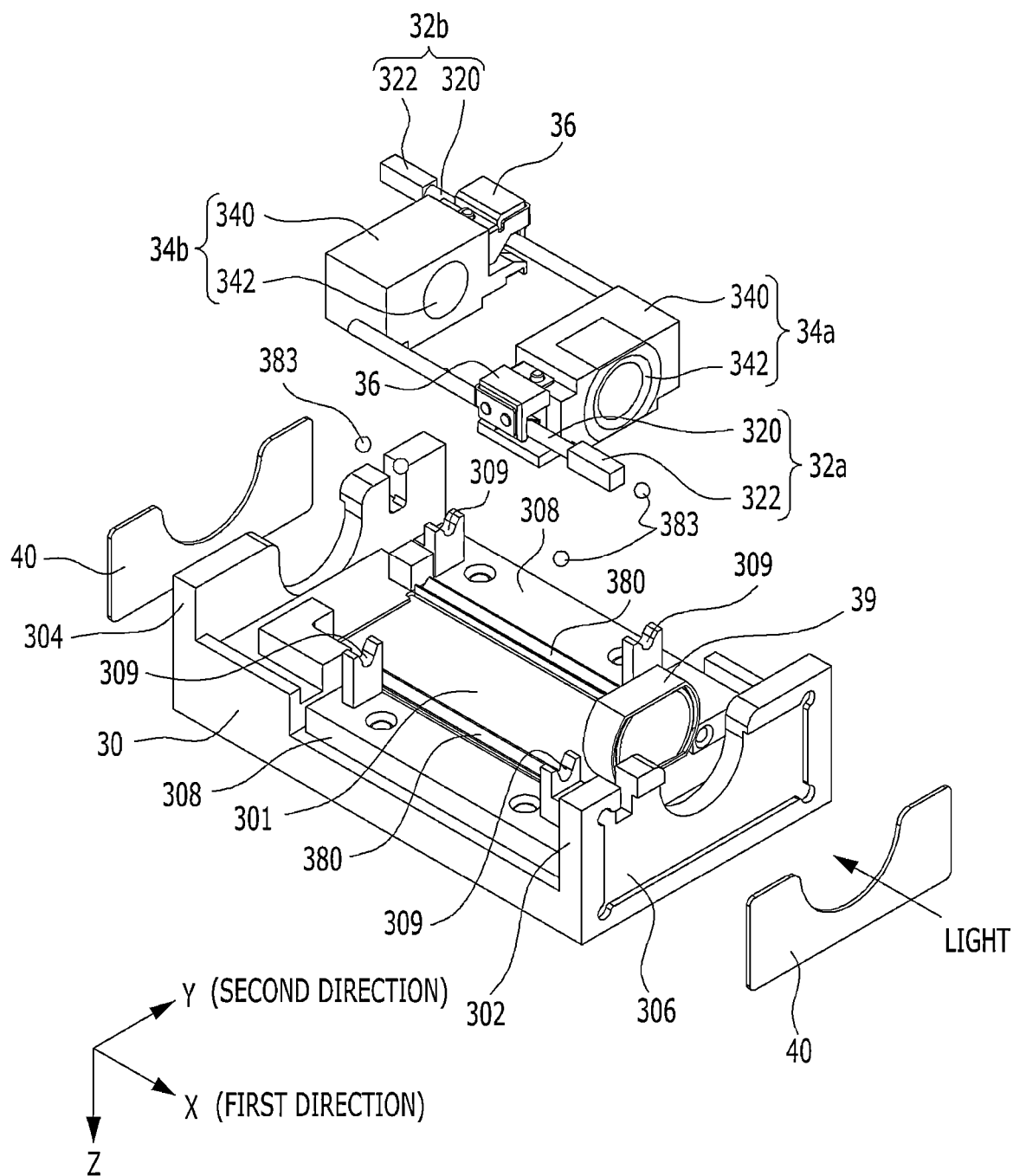
FIG. 1 is an exploded perspective view of a camera actuator according to an exemplary embodiment of the present disclosure.

Hereinafter, an exemplary embodiment of the present disclosure will be described in detail.

The terms used in the present specification are used to just describe a specific embodiment and do not intend to limit the present disclosure. Singular expressions include plural expressions unless clearly described as different meanings in the context.

In the present specification, it should be understood that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance.

In addition, the terms such as "first" and "second" may be used to describe various constituent elements, but the constituent elements should not be limited by the terms. These terms are used only to distinguish one constituent element from another constituent element.

Further, the term "unit", "part", "module", or the like, which is described in the specification, means a unit that performs at least one function or operation, and the "unit", "part", "module", or the like may be implemented by hardware, software, or a combination of hardware and software.

In the description of the exemplary embodiments with reference to the accompanying drawings, the same constituent elements will be designated by the same reference numerals, and the repetitive description thereof will be omitted. Further, in the description of the present disclosure, the specific descriptions of publicly known related technologies will be omitted when it is determined that the specific descriptions may unnecessarily obscure the subject matter of the present disclosure.

Hereinafter, for convenience of description, the present disclosure will be described with reference to a three-axis coordinate system.

For reference, in the three-axis coordinate system, an X-axis indicates a direction, i.e., an optical axis direction in which light passes through an actuator of the present disclosure. Hereinafter, a direction coincident with or parallel to the X-axis will be referred to as a 'first direction'. Further, a Z-axis indicates a direction perpendicular to the X-axis. A Y-axis indicates a direction orthogonal to the X-axis on a plane perpendicular to the Z-axis. Hereinafter, a direction coincident with or parallel to the Y-axis will be referred to as a 'second direction'.

One aspect of the present disclosure provides a piezoelectric camera actuator capable of implementing zoom-in, zoom-out, and auto-focusing by moving an optical unit, which is a driving body, in an optical axis direction by an arbitrary distance by using vibration generated by a vibration generator, particularly a piezoelectric element by a high-frequency pulse voltage applied from the outside.

Hereinafter, in the description of the present disclosure, an example will be illustrated and described in which two optical units are disposed on a single camera actuator and spaced apart from each other in a first direction, and driving units are disposed for the two optical units. Of course, this configuration is just one exemplary embodiment for explaining the present disclosure, and the number of optical units and the number of driving units are not limited to the configuration illustrated in the drawings.

In other words, as one exemplary embodiment for explaining the present disclosure, an example will be described below in which the two optical units and the two driving units are disposed on the single camera actuator. However, the present disclosure is not limited to the two pairs of movable units and driving units. This is because the number of movable units and the number of driving units may vary depending on the required specifications of the camera as much as needed.

Figure 2:
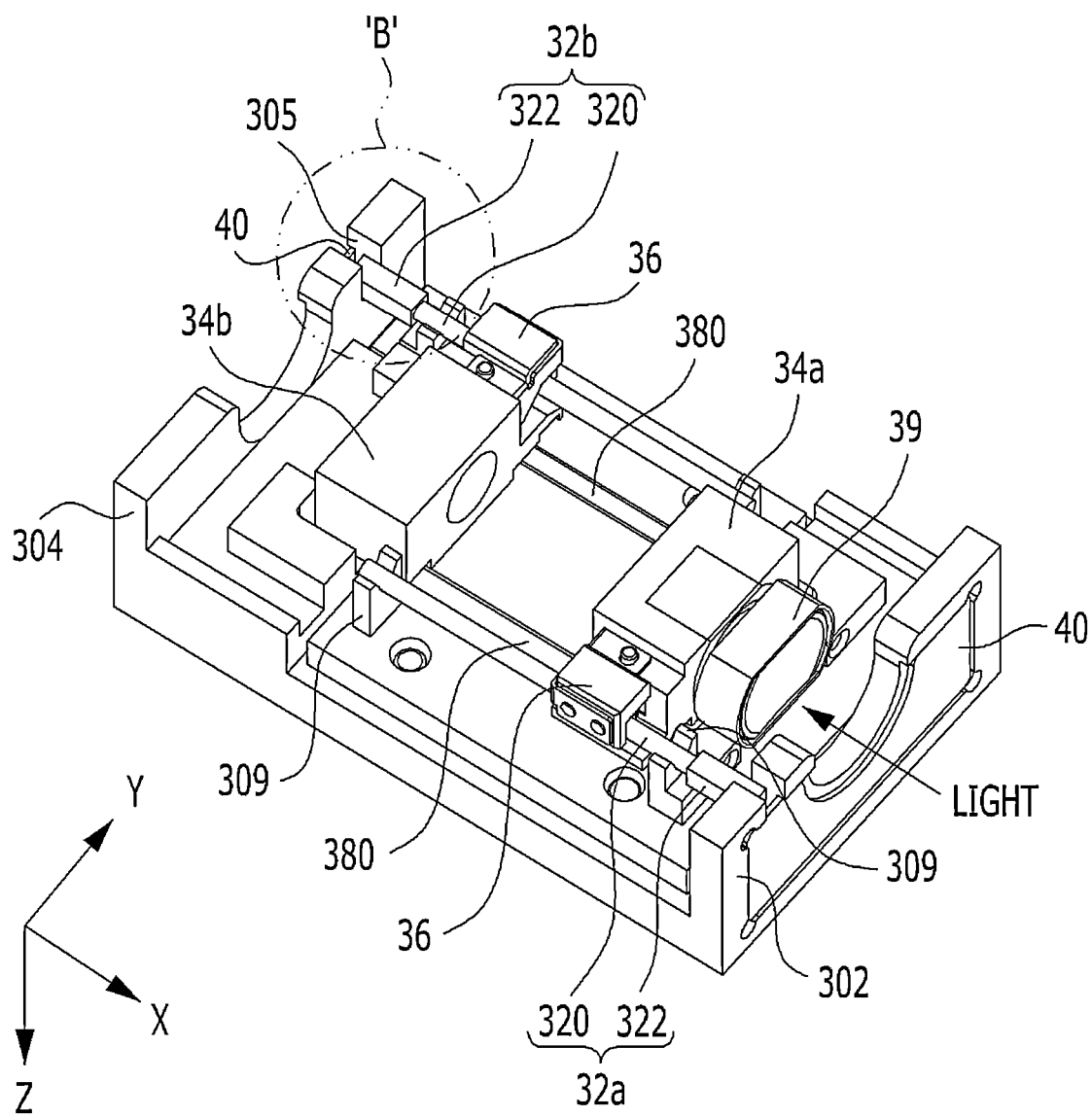
FIG. 2 is a coupled perspective view of the camera actuator illustrated in FIG. 1.

FIG. 1 is an exploded perspective view of a camera actuator according to an exemplary embodiment of the present disclosure, and FIG. 2 is a perspective view illustrating a state in which the camera actuator illustrated in FIG. 1 is coupled, and an upper cover is excluded. Further, FIG. 3 is a top plan view of the camera actuator illustrated in FIG. 2 when viewed from the top side.

Figure 3:
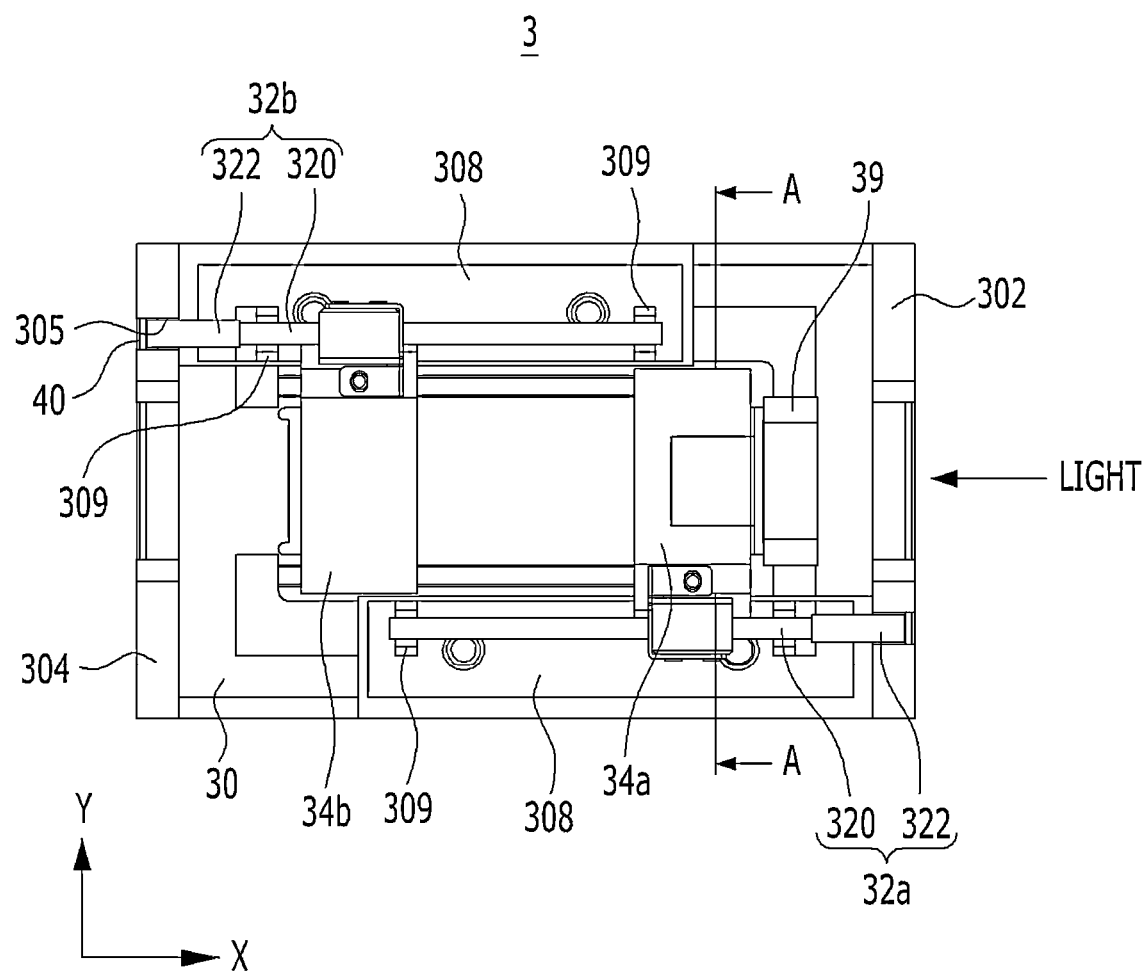
FIG. 3 is a top plan view of the camera actuator illustrated in FIG. 2 when viewed from the top side.

With reference to FIGS. 1 to 3, a camera actuator 3 according to an embodiment of the present disclosure includes a housing 30. In particular, as illustrated in the drawings (FIGS. 1 and 2), the housing 30 has an accommodation space (no reference numeral) therein. In the housing 30, a central portion of one side wall perpendicular to a first direction axis and a central portion of the other side wall opposite to one side wall have openings (no reference numeral) having particular areas so that light may pass therethrough. The housing 30 is opened at an upper side thereof.

A pair of ball rails 380, which is parallel to each other, is provided on an upper surface of a bottom portion of the housing 30. Further, support parts 308 may be installed one by one on the upper surface of the bottom portion at one side and the other side opposite to one side based on the second direction perpendicular to the first direction, and the support parts 308 may each have at least two or more support members 309. In this case, the support members 309 are each formed at a predetermined height from the bottom portion and each have a groove (no reference numeral) formed at an upper end thereof and having an arc shape.

A non-illustrated upper cover is coupled to an upper side of the housing 30. Driving units 32 are mounted in the housing 30. Optical units 34 are mounted in the housing 30 and configured to be moved in the first direction in the housing 30 by driving power generated by the driving units 32. In this case, the driving unit 32 includes a shaft 320 extending in the first direction, and a vibration generator 322 configured to apply vibration to the shaft 320 in the first direction.

The shaft 320 may have a rod structure elongated in the first direction and be disposed to be spaced apart from the bottom surface of the housing 30 by the support members 309. In particular, the shaft 320 may be a long rounded rod, i.e., a round bar. However, the shaft 320 is not limited to the round bar. A shape of the groove of the support member 309 may vary depending on a cross-sectional shape of the shaft 320.

In particular, the shaft 320 may be a carbon bar. A part of an outer surface of the shaft 320 may be seated in the groove of the support member 309 while adjoining the groove of the support member 309 in a circumferential direction. In this case, the shaft and the support member may be coupled to each other by a bonding agent so that the shaft 320 does not separate from the support member 309 when the shaft 320 is vibrated by vibration applied from the vibration generator 322.

In order to fix the shaft 320 to the support member 309 by a bonding process using the bonding agent, a bonding agent, which has elasticity that may allow a piezoelectric motion of the shaft 320, which is extended or contracted in the first direction by vibration generated by the vibration generator 322, within a predetermined range, may be used as the bonding agent. For example, the bonding agent may be soft epoxy.

The optical unit 34 is moved in the first direction in the housing 30 by driving power generated by the driving unit 32. In particular, as illustrated in the drawings, the optical units 34 are provided as two optical units 34a and 34b provided independently of each other so as not to restrict motions thereof nor interfere with each other. The optical units 34a and 34b may be disposed at front and rear sides in the first direction and provided on the same line. The driving units 32a and 32b may be disposed one by one while respectively corresponding to the two optical units.

Hereinafter, for convenience of description, one of the two optical units 34, which is positioned at a relatively front side based on a movement direction, will be referred to as a 'first optical unit 34a', and the other of the two optical units 34, which is positioned at a relatively rear side, will be referred to as a 'second optical unit 34b'. Further, the driving units, which generate driving power for the first optical unit 34a and the second optical unit 34b, will be referred to as a 'first driving unit 32a' and a 'second driving unit 32b'.

The first driving unit 32a may be installed in the first direction at one side in the housing 30. Specifically, the first driving unit 32a may include the shaft 320 extending in the first direction, and the vibration generator 322 configured to apply vibration to the shaft 320 in the first direction. Further, the second driving unit 32b may be installed at the other side in the housing 30 and disposed in parallel with the first driving unit 32a.

In this case, the second driving unit 32b may be identical in configuration to the first driving unit 32a, except that the positions of the vibration generators configured to apply vibration to the shafts 320 (the directions in which the vibration generators are connected to the shafts) are opposite to each other.

The vibration generators 322 of the first and second driving units 32a and 32b may be installed one by one at one side edge and the other side edge of the housing 30 based on an oblique direction, such that the vibration generators 322 may be structured to face each other in a diagonal direction. The two shafts 320 respectively connected to the two vibration generators 322 may be disposed to be parallel to each other in a plan view. The two shafts 320 may be disposed such that the two shafts 320 completely overlap each other or partially overlap each other, except for a part of the tip, when viewed in the second direction.

The first optical unit 34a performs a translational motion in the first direction along the ball rails 380 in the housing 30 by driving power generated by the first driving unit 32a. Further, the second optical unit 34b is spaced apart from the first optical unit 34a at a predetermined distance disposed rearward of the first optical unit 34a. The second optical unit 34b performs a translational motion in the first direction along the ball rails 380 by driving power generated by the second driving unit 32b.

The first and second driving units 32a and 32b and the first and second optical units 34a and 34b may be connected to one another by means of frictional movement units 36, such that the optical unit corresponding to the driving unit may be moved in the first direction when the driving unit operates. The first and second driving units 32a and 32b may be independently operated in response to control signals individually outputted to the first and second driving units 32a and 32b by a control unit (not illustrated). Therefore, the first and second optical units 34a and 34b may be independently operated.

The vibration generators 322, which apply vibration, in the first direction, to the shafts 320 of the first driving unit 32a and the second driving unit 32b, may each be a piezoelectric vibration generator. More specifically, the vibration generator may be a piezoelectric motor including a piezoelectric element that is quickly vibrated in the first direction by a high-frequency pulse voltage applied from the outside.

The first and second optical units 34a and 34b may each include a lens barrel 342, and a carrier 340 on which the lens barrel 342 is mounted. A plurality of lenses, which constitutes the lens barrel 342, may have identical or different optical characteristics such as focal lengths and refractive indexes. The carrier 340 may have a mounting surface or an accommodation surface (no reference numeral) on which the lens barrel 342 is mounted.

Although not illustrated in the drawings, in some instances, the lens barrel 342, in which the plurality of lenses is mounted, may be integrated with the carrier 340. That is, the first and second optical units 34a and 34b may be configured such that the lens barrel 342 and the carrier 340, which constitute each of the first and second optical units 34a and 34b, are integrated into a single object.

A part of the frictional movement unit 36 is installed on the shaft 320 of each of the first and second driving units 32a and 32b and adjoins a part of the outer surface of the shaft 320 while surrounding a part of the outer surface of the shaft 320 in the circumferential direction. Therefore, when the shaft 320 vibrates in the first direction, the frictional movement unit 36 may move in the first direction along the corresponding shaft 320. Another part of the frictional movement unit 36 may be connected to the corresponding optical unit 34a or 34b.

According to the above-mentioned configuration, when vibration is applied to the shaft 320 in the first direction by the operation of the vibration generator 322, the shaft 320 is vibrated in the first direction by the applied vibration, and the frictional movement unit 36 moves along the corresponding shaft 320. The optical unit 34a or 34b is moved in the first direction in the housing 30 by the frictional movement unit 36 that moves as described above.

For example, when the vibration generator 322 of the first driving unit 32a is quickly vibrated in the first direction by a high-frequency pulse voltage applied from the outside, the corresponding shaft 320 is also vibrated while being repeatedly extended and contracted quickly in the first direction. In this case, when the shaft 320 quickly moves in the extension direction and slowly moves in the contraction direction, the frictional movement unit 36 and the first optical unit 34a moves in the direction in which the shaft 320 is contracted.

When the shaft 320 is quickly extended, the frictional movement unit 36 does not move because of static inertia that maintains the stopped state. However, because a frictional force between the frictional movement unit 36 and the shaft 320 is higher than the static inertia in the contraction direction of the shaft 320 that moves relatively slowly, the frictional movement unit 36 and the first optical unit 34a move together with the shaft 320 in the direction in which the shaft 320 is contracted.

Figure 4A:
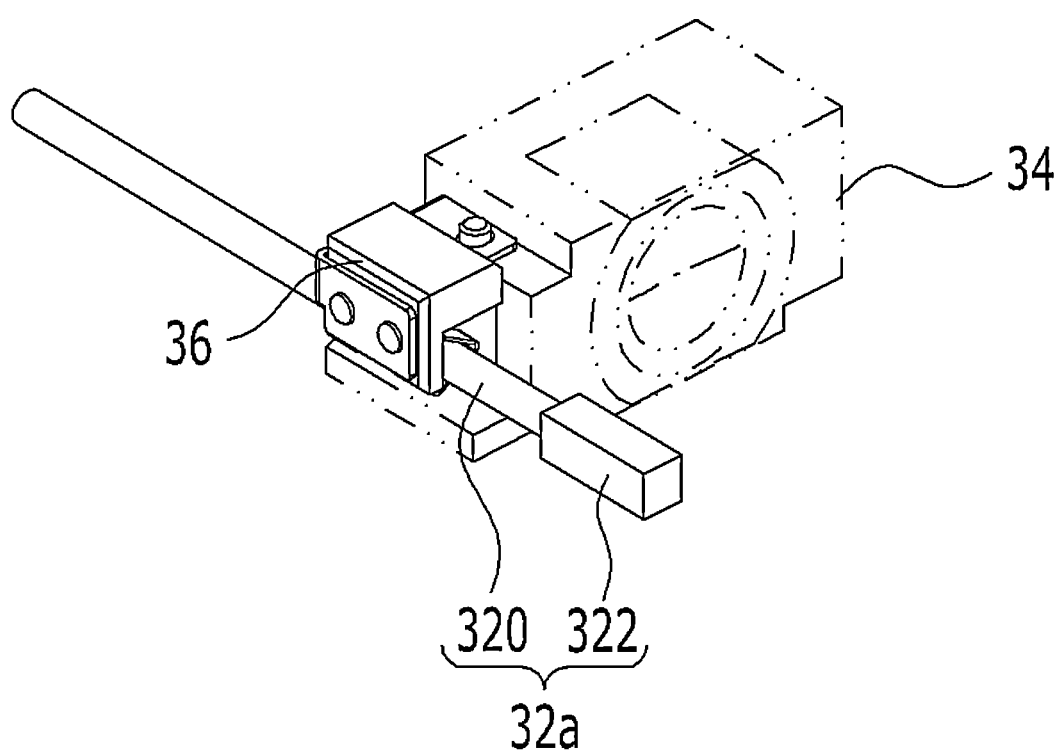
FIGS. 4A and 4B are perspective view and exploded perspective view of a frictional movement unit.
Figure 4B:
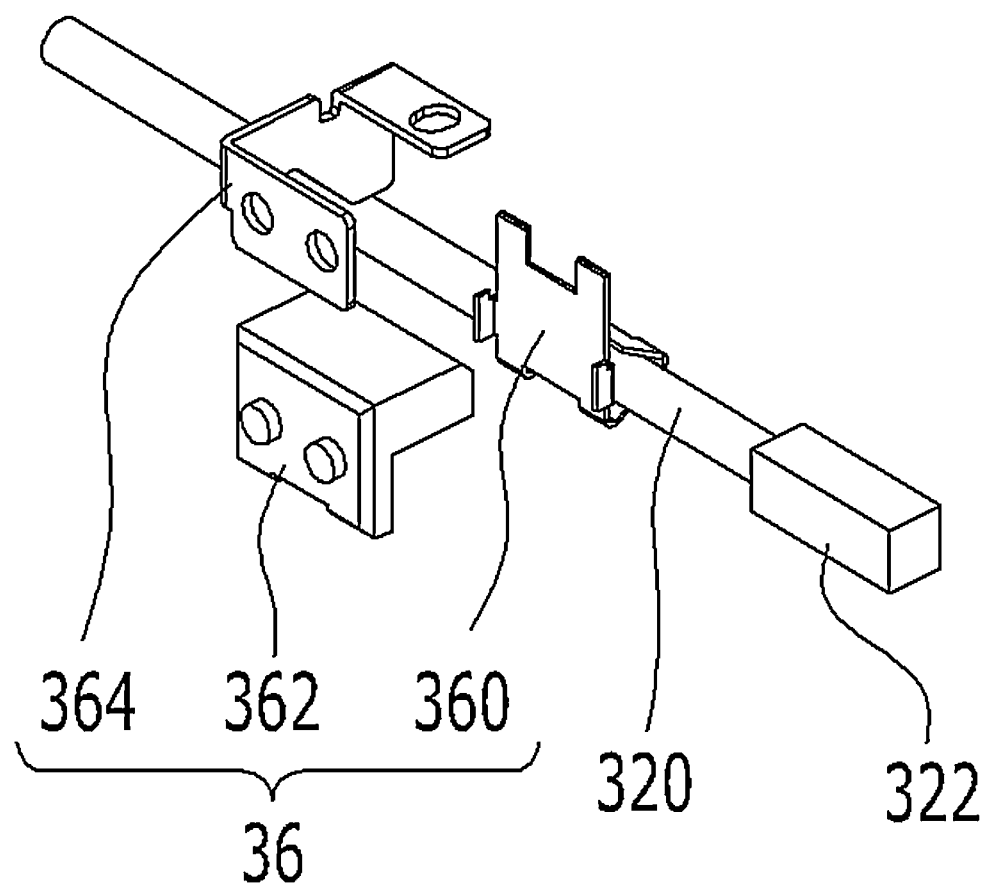

FIG. 4 is a perspective view and an exploded perspective view of the frictional movement unit.

With reference to FIG. 4, the shaft 320 may be, but not limited to, a round bar having a circular cross-sectional shape. The frictional movement unit 36 may include a friction clamp 360 structured to surround a part of the outer surface of the shaft 320 and disposed on the shaft 320, and a clamp block 362 on which the friction clamp 360 is mounted, and the clamp block 362 may be attached to a lateral portion of the optical unit 34 by means of a connection member 364.

The friction clamp 360 may be formed in an approximately triangular shape as one of the three edges of the friction clamp 360 is cut out or spread, such that the friction clamp 360 may be linearly in contact with three points of a part of a peripheral surface of the shaft 320. However, the present disclosure is not limited thereto. The friction clamp 360 only needs to be formed in a shape corresponding to the cross-sectional shape of the shaft 320 and surround a part of the outer surface of the shaft 320.

Figure 5:
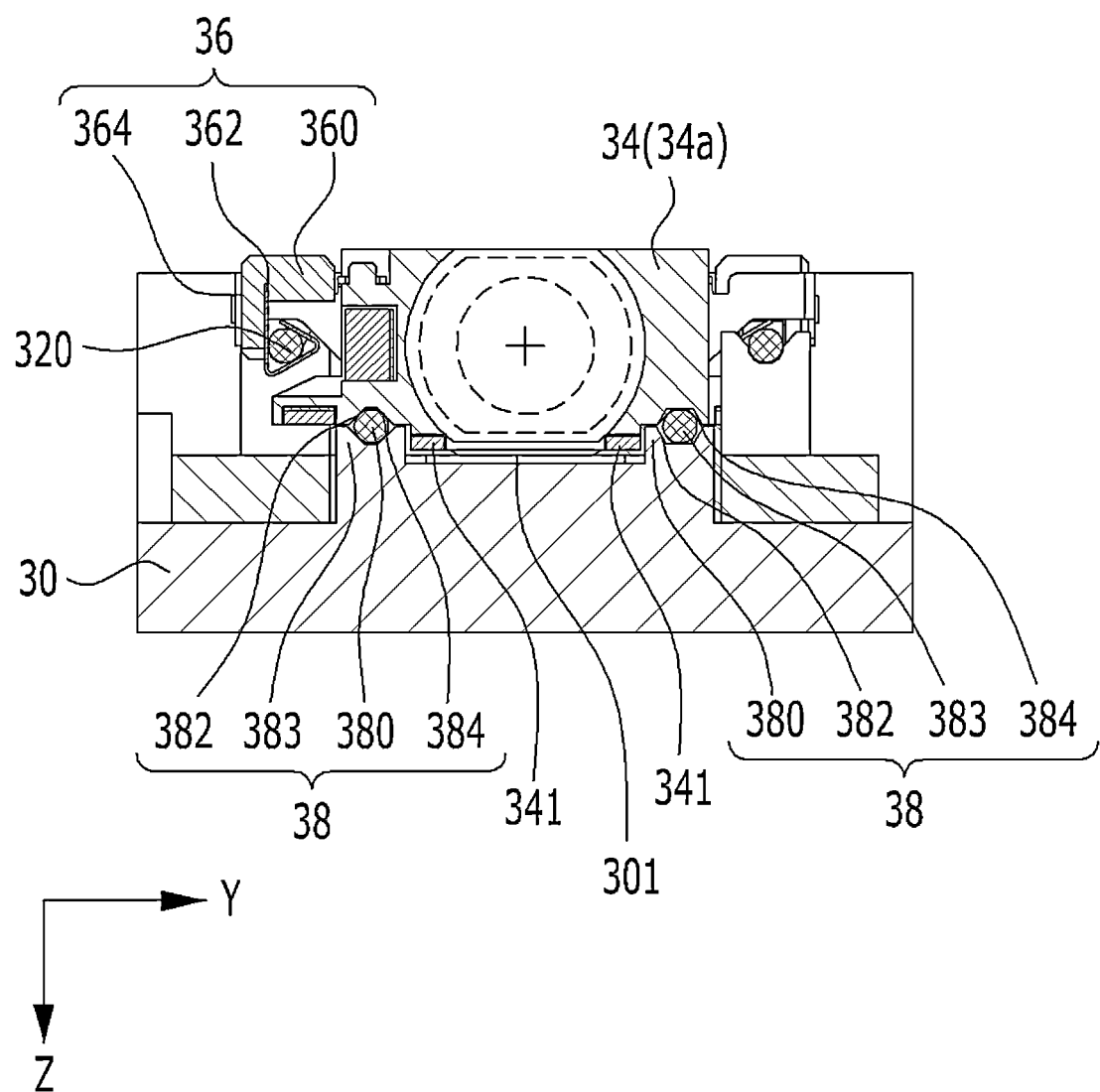
FIG. 5 is a cut-out cross-sectional view of the camera actuator illustrated in FIG. 3 taken along line A-A.

FIG. 5 is a cut-out cross-sectional view of the camera actuator illustrated in FIG. 3 taken along line A-A.

With reference to FIGS. 1 to 3 and 5, ball guides 38 are installed between the housing 30, the first optical unit 34a, and the second optical unit 34b. The ball guides 38 serve to align the two optical units 34a and 34b with the optical axis and serve as guides so that the first direction rectilinear motions (translational motions) of the first and second movable units 34a and 34b relative to the housing 30 may be stably performed between the housing 30 and the first and second movable units 34a and 34b.

In particular, the ball guides 38 are formed on the bottom surface of the housing 30 and elongated in the first direction and include the pair of ball rails 380 provided to be parallel to each other and having upper surfaces having first ball grooves 382 continuously formed in the first direction, second ball grooves 384 formed at one side and the other side opposite to one side of lower surfaces of the first and second movable units 34a and 34b while corresponding to the first ball grooves 382, and balls 383 interposed between the first ball grooves 382 and the second ball grooves 384 corresponding to one another.

Figure 6:
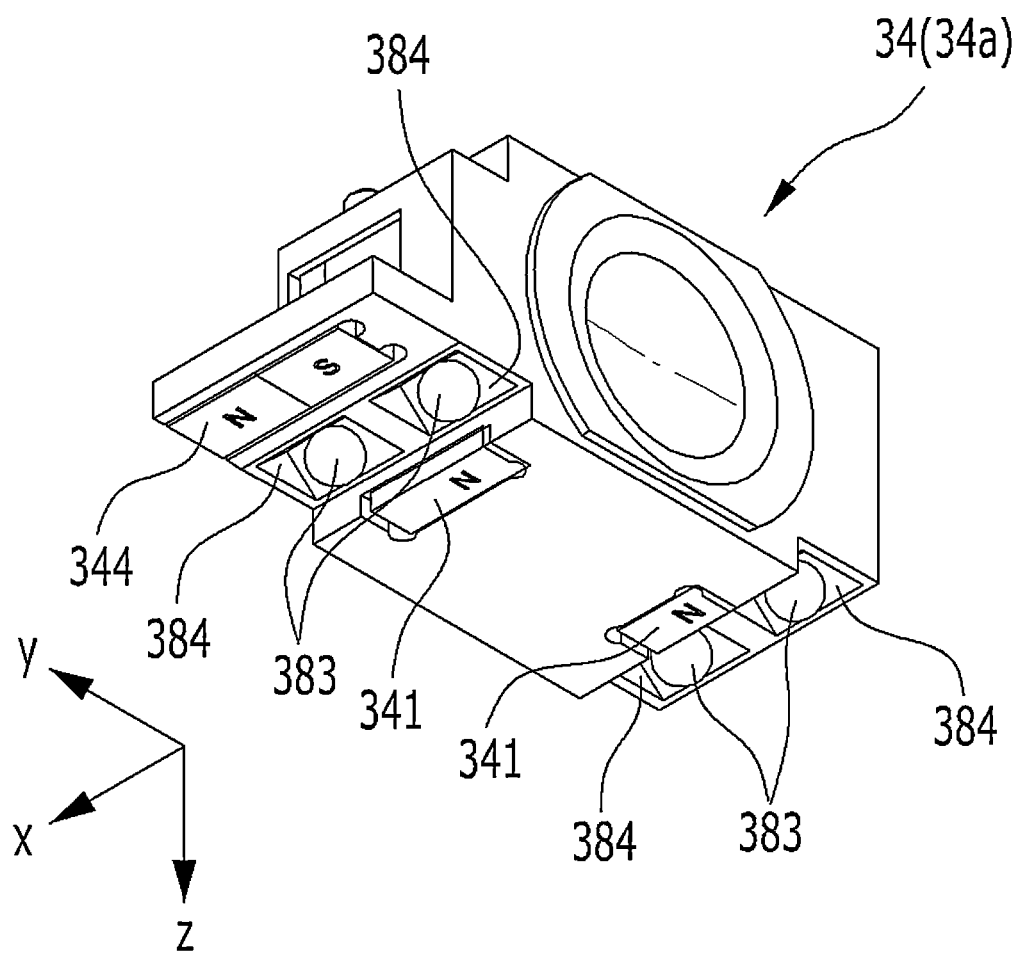
FIG. 6 is a perspective view of an optical unit applied to the camera actuator according to the embodiment of the present disclosure when viewed from the bottom side.

More specifically, as illustrated in FIG. 6, when the carriers 340 of the optical units 34 are viewed from the bottom surface, the two or more second ball grooves 384 may be independently formed as pocket types at one side and the other side opposite to one side of the lower surfaces of the carriers 340 of the first and second movable units 34a and 34b. The balls may be interposed one by one in the second ball grooves 384, thereby preventing interference or friction between the adjacent balls 383 when the optical units 34 move.

When considering product assemblability and driving characteristics of the movable unit after being assembled in consideration of a manufacturing tolerance between the carrier 340 and the housing 30, one of the pair of parallel ball rails 380 may have the first ball groove 382 formed in a V groove continuously formed in the first direction, and the other of the pair of parallel ball rails 380 may have the first ball groove 382 formed in an U groove. However, the present disclosure is not necessarily limited thereto.

A part of the ball 383 may be disposed to be accommodated in the first ball groove 382, and another part of the ball 383 may be disposed to be accommodated in the second ball groove 384. Therefore, when the second ball groove 384 moves relative to the first ball groove 382 as the optical unit 34 rectilinearly moves in the first direction, the balls roll between the ball grooves 382 and 384, such that the first direction rectilinear motion of the optical unit 34 may be softly and stably implemented in the housing 30.

A magnetic element 301 may be mounted on the upper surface of the bottom portion of the housing 30 on which the optical unit 34 is mounted. Further, a magnet 341 may be mounted on a lower surface of the optical unit 34 that faces the bottom portion of the housing 30. In this case, the magnet 341 serves to generate an attractive force with respect to the magnetic element 301 mounted on the housing 30, such that the optical unit 34 exhibits stable motion characteristics in the first direction in a state in which the optical unit 34 is in close contact with the bottom portion.

Meanwhile, two or more Hall sensors (not illustrated) may be mounted on the bottom portion of the housing 30 and aligned at a distance therebetween in the first direction. Further, Hall magnets 344 may be mounted on the lower surfaces of the optical units 34a and 34b and face the Hall sensor, which is mounted on bottom portion of the housing 30, at a predetermined distance (see FIGS. 5 and 6).

The Hall sensor detects positions of the Hall magnets 344 by using the Hall effect, generates a corresponding signal, and outputs the signal to a drive IC (not illustrated). The drive IC recognizes first direction positions of the optical units 34a and 34b in the housing on the basis of the signal from the Hall sensor. Further, the drive IC determines control values for the driving units 32a and 32b on the basis of the recognized position values.

In other words, the drive IC recognizes the accurate first direction positions of the first and second optical units 34a and 34b on the basis of the signal from the Hall sensor, determines the control values for the first and second driving units 32a and 32b on the basis of the recognized position information, and independently feedback-controls the first direction positions of the first and second optical units 34a and 34b by means of the first and second driving units 32a and 32b on the basis of the determined control values, thereby implementing optical zoom and auto-focusing.

Figure 7:
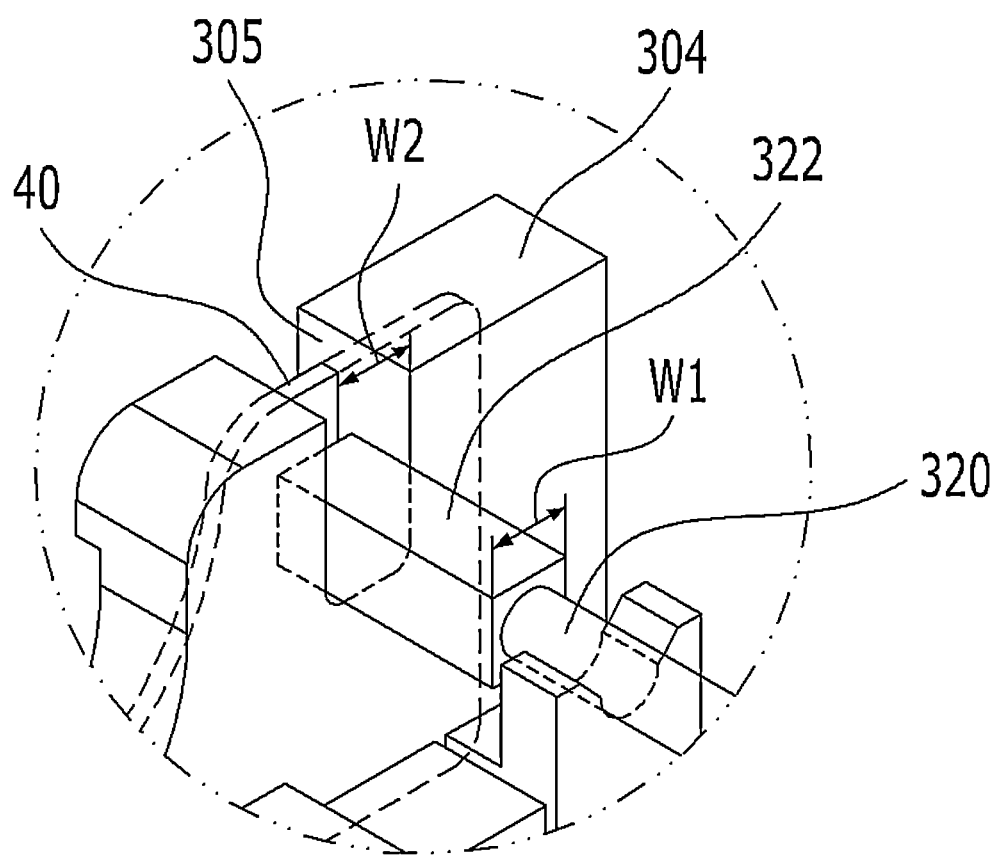
FIG. 7 is an enlarged perspective view of a main part of the present disclosure.
Figure 8:
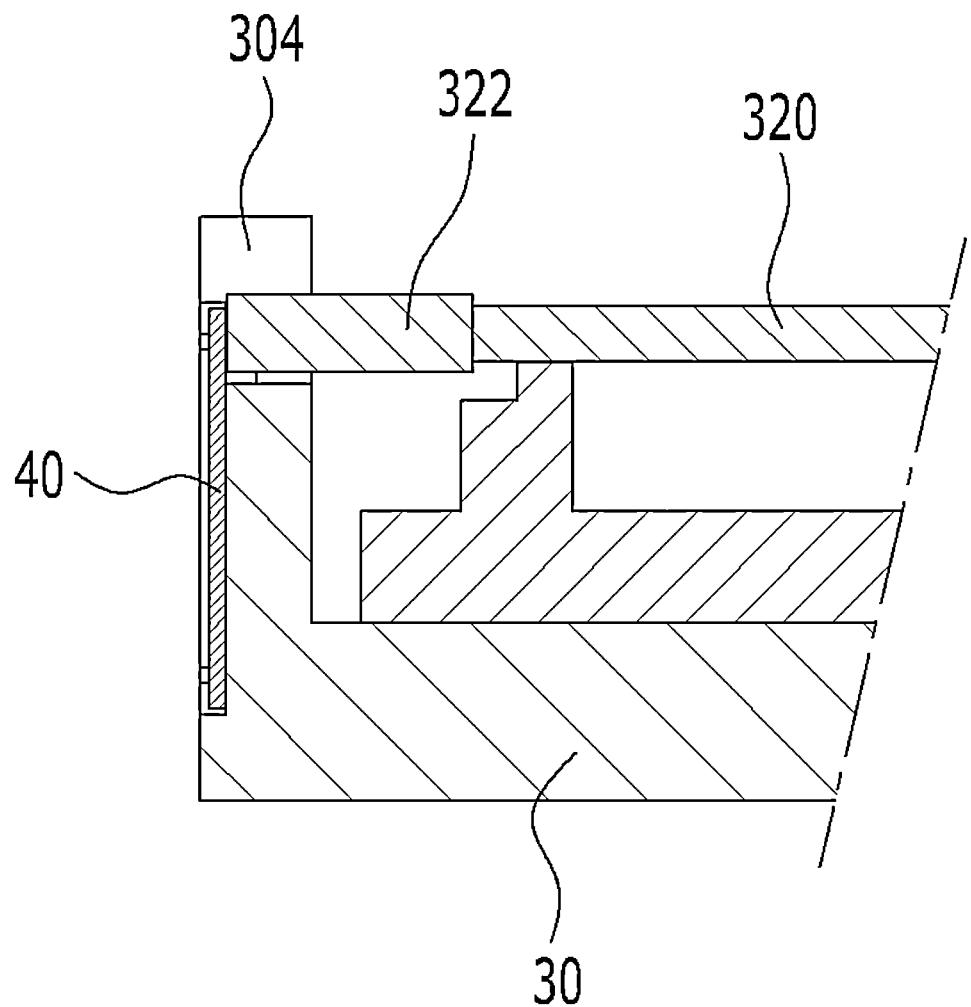
FIG. 8 is a cut-out cross-sectional view of the main part of the present disclosure illustrated in FIG. 7.

FIG. 7 is a main part enlarged perspective view illustrating the main part of the present disclosure and illustrating part 'B' in FIG. 2, and FIG. 8 is a cut-out cross-sectional view of the main part of the present disclosure illustrated in FIG. 7.

With reference to FIGS. 7 and 8, a counteraction suppression plate 40 is installed on a sidewall 304 of the housing 30 that is perpendicular to the first direction axis (perpendicular to the optical axis direction). For reference, the drawing illustrates only the rear sidewall 304 of the two housing sidewalls 302 and 304 perpendicular to the first direction axis. The counteraction suppression plate 40 may also be installed on the opposite front sidewall 302 in the same way. A coupling structure, which will be described below and serves to suppress a counteraction of the vibration generator 322, is applied in the same way.

The counteraction suppression plate 40 serves as a kind of weight member that supports the vibration generator 322 from the rear side and suppresses a counteraction of the vibration generator 322 so that the vibration generated by the vibration generator 322 is maximally transmitted to the shaft without a loss. The counteraction suppression plate 40 may be made of a metallic material and have a structure coupled to the sidewall of the housing 30 so that an end surface of the vibration generator 322 is in close contact with the counteraction suppression plate 40.

More specifically, a binding groove 305 may be formed in the sidewall 304 on which the counteraction suppression plate 40 is installed. The binding groove 305 may have a width W2 corresponding to a width W1 of the vibration generator 322. As illustrated in the drawings, the binding groove 305 may be formed to have a predetermined depth from an upper end of the sidewall 304. The counteraction suppression plate 40 may be mounted on a mounting surface 306 formed on an outer surface of the sidewall 304, and a part of the counteraction suppression plate 40 is installed to be exposed to the inside of the housing 30 through the binding groove 305.

The vibration generator 322 may be securely fixed by being bound to the sidewall 304 of the housing by means of the binding groove 305. Specifically, a part of a distal end of the vibration generator 322 opposite to the shaft 320 is inserted into the binding groove 305, such that the end surface of the vibration generator 322 is fixed by being in close contact with the counteraction suppression plate 40. That is, in the state in which the counteraction suppression plate 40 installed on the sidewall 304 supports the vibration generator 322 from the rear side, a part of the vibration generator 322 is fixed by being bound to the sidewall 304 of the housing 30.

With the above-mentioned configuration, when the vibration generator 322 generates vibration by a high-frequency pulse voltage applied from the outside and applies the vibration to the shaft 320 connected to one side, the counteraction suppression plate 40 installed on the housing 30 may support the vibration generator 322 from the rear side, thereby effectively suppressing a counteraction of the vibration generator 322 (a situation in which the vibration generator is pushed rearward) caused by an interaction (action and reaction) between the shaft 320 and the vibration generator 322.

Non-described reference numeral 39 indicates a stationary optical unit (see FIGS. 1 to 3). As illustrated in the drawings (FIGS. 1 to 3), the stationary optical unit 39 may be disposed in one side opening portion of the housing 30 into which light is introduced. The stationary optical unit 39 may include a lens barrel configured to accommodate a lens group including a plurality of lenses. In this case, the lenses may have identical or different optical characteristics such as focal lengths and refractive indexes.

Figure 10:
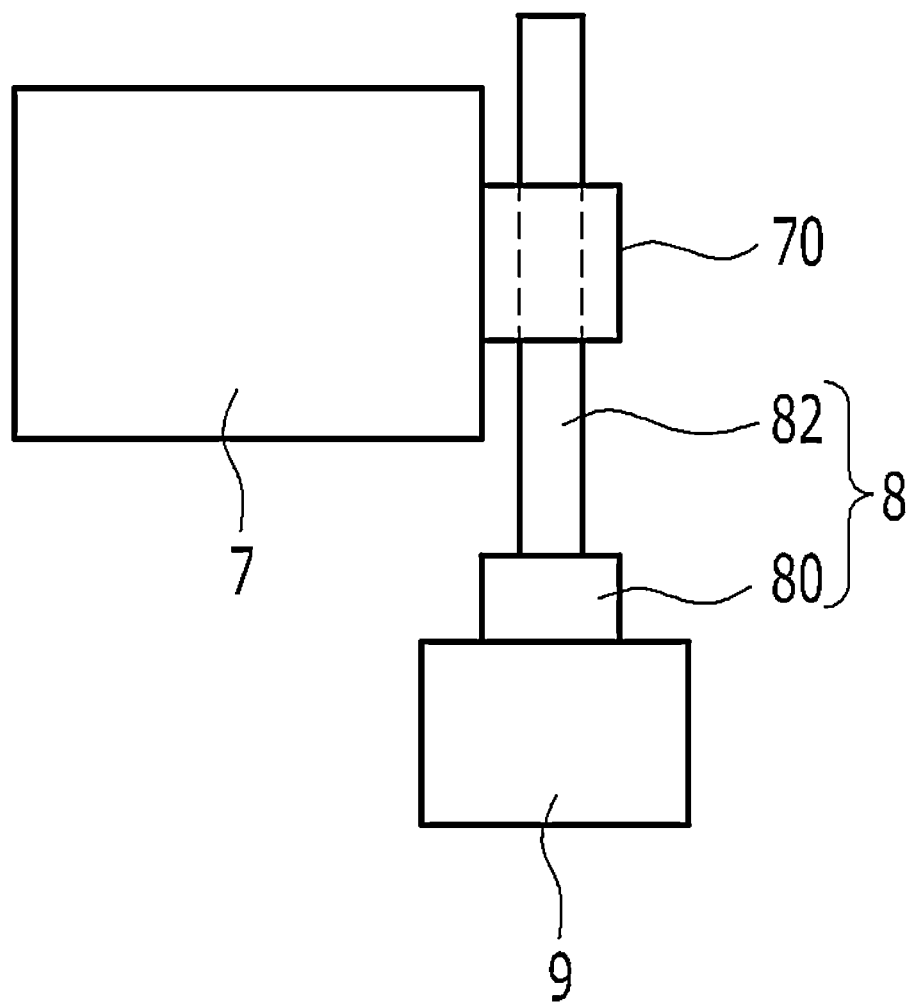
FIG. 10 is a schematic view of a piezoelectric optical system driving device in the related art.

A piezoelectric optical system drive device in the related art applied to a folded zoom camera module adopts a configuration that suppresses a counteraction of a piezoelectric element by attaching a separate dummy, which corresponds to a kind of weight, to a distal end of the piezoelectric element, which is a vibration generation means, i.e., an end of the piezoelectric element opposite to a portion connected to a shaft (see FIG. 10).

However, the method of attaching the dummy in the related art requires a mounting space in the camera module by a volume of the attached dummy, which makes it difficult to implement the camera module with a compact size. Further, there is a problem in that a center of gravity of the piezoelectric element is biased rearward by the dummy, and the shaft positioned opposite to the dummy is separated, and the optical axis direction is misaligned, which adversely affects the camera performance.

In contrast, according to the camera actuator according to the embodiment of the present disclosure, the means (counteraction suppression plate) for suppressing the counteraction of the vibration generator has the plate-shaped structure and is installed on the sidewall of the actuator housing in the related art, thereby eliminating the effort to ensure a separate space (the effort to ensure an additional space for accommodating a dummy in the related art) and making the camera module more compact to the extent that the dummy having a predetermined volume is eliminated.

That is, it is possible to effectively suppress the counteraction of the vibration generator even without a separate dummy, miniaturize the camera module by eliminating the dummy, and stably exhibiting optical zoom and auto-focusing performance because there is no problem in that a center of gravity of the piezoelectric element is biased rearward by the dummy, and the shaft positioned opposite to the dummy is separated, and the optical axis direction is misaligned.

Figure 9:
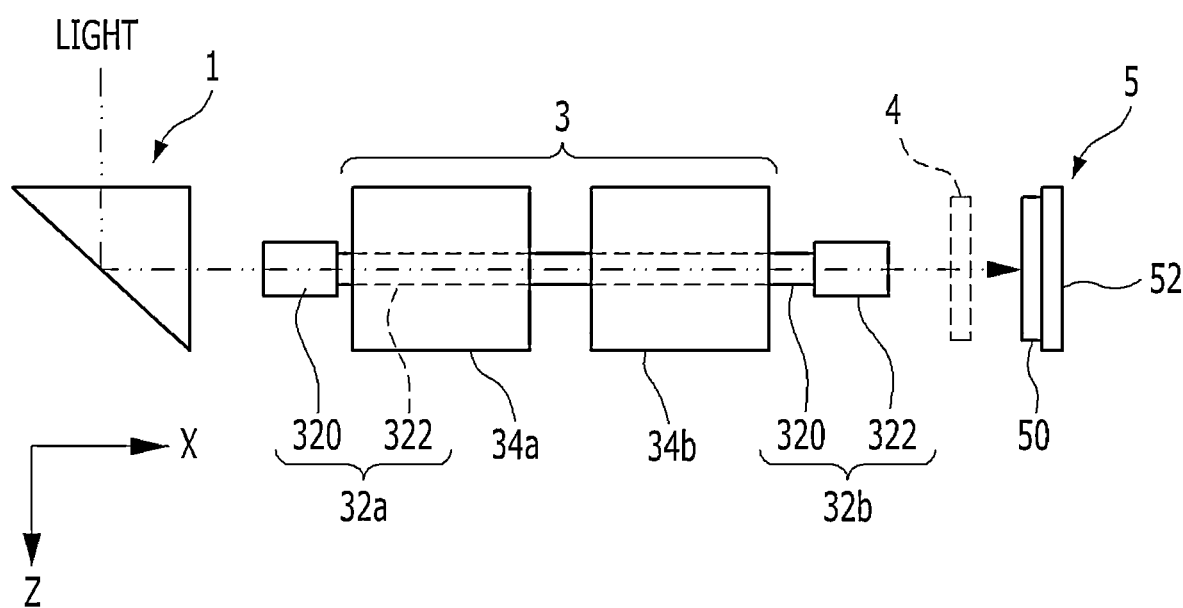
FIG. 9 is a schematic view of a folded zoom camera module including the camera actuator according to the embodiment.

Meanwhile, FIG. 9 is a schematic view of a folded zoom camera module including the camera actuator according to the embodiment.

With reference to FIG. 9, a folded zoom camera module according to another aspect of the present disclosure includes a reflection system 2, the camera actuator 3, and an image sensor unit 5. The camera actuator 3 may be the camera actuator 3 described above. The reflection system 2 is disposed forward of the camera actuator based on a propagation direction of light and reflects light, which is introduced from the outside, toward the camera actuator 3.

The reflection system 2 may be a minor or prism having a reflective surface 20 that reflects light, which is introduced from the outside, and is inclined at a particular angle, particularly an angle of 45 degrees. The camera actuator 3 may be configured such that the two or more optical units 34a and 34b, which constitute the camera actuator 3, are independently operated in the first direction by the driving units 32a and 32b that generate driving power for the optical units 34a and 34b.

When the two or more optical units 34a and 34b are independently operated as described above, the zoom-in and zoom-out are implemented over a wide range, such that more precise, fine, and high-magnification zoom performance may be exhibited.

The image sensor unit 5 receives the light having passed through the movable unit of the camera actuator 3 and outputs image information corresponding to the received light. The image sensor unit 5 may include a substrate 52, and an image sensor 50 mounted on the substrate 52. In this case, the image sensor 50 collects image information from the light having passed through the movable unit 34a and 34b, and the collected image information may be outputted to the outside through the substrate 52.

An IR filter 4 may be installed on an optical path between the camera actuator 3 and the image sensor unit 5. The IR filter 4 serves to filter out a particular wavelength, particularly an infrared ray wavelength included in incident light and allow the light, from which the infrared ray wavelength is filtered out, to be projected onto the image sensor module 5. The drawing illustrates that the IR filter 4 is disposed between the camera actuator 3 and the image sensor module 5. However, the present disclosure is not limited thereto.

Only the specific exemplary embodiments have been disclosed in the above-mentioned detailed description of the present disclosure. However, it should be understood that the present disclosure is not limited to the specific forms mentioned in the detailed description, but rather, it should be understood that the present disclosure includes all modifications, equivalents, and substitutes within the spirit and scope of the present disclosure defined by the appended claims.

DESCRIPTION OF REFERENCE NUMERALS

1: Camera module
2: Reflection system
3: Camera actuator
4: IR filter
5: Image sensor unit
20: Reflective surface
30: Housing
32: Driving unit
32a: First driving unit
32b: Second driving unit
34: Optical unit
34a: First optical unit
34b: Second optical unit
36: Frictional movement unit
38: Ball guide unit
39: Stationary optical unit
40: Counteraction suppression plate
50: Image sensor
52: Substrate
301: Magnetic element
302, 304: Sidewall of housing
305: Binding groove
306: Mounting surface
308: Support part
309: Support member
320: Shaft
322: Vibration generator
340: Carrier
341: Magnet
342: Lens barrel
344: Hall magnet
360: Friction clamp
362: Clamp block
364: Connection member
380: Ball rail
382: First ball groove
383: Ball
384: Second ball groove

The invention claimed is:

1. A camera actuator comprising:
a housing;
a driving unit mounted in the housing and comprising a vibration generator configured to generate vibration from input power, and a shaft configured to be vibrated in a first direction by the vibration generated by the vibration generator;
an optical unit comprising a lens barrel including at least one lens, the optical unit being configured to implement zooming and auto-focusing while being operated in the first direction in the housing by the vibration of the shaft;
a frictional movement unit including a friction clamp disposed on the shaft and configured to connect the shaft and the optical unit to transmit the vibration of the shaft to the optical unit; and
a ball guide part including a ball rail extending in the first direction and configured to support the optical unit, such that the optical unit rolls in the first direction relative to the housing,
wherein a counteraction suppression plate is configured to suppress a counteraction of the vibration generator when the driving unit vibrates in the first direction, and is disposed on a sidewall of the housing, the sidewall being perpendicular to a first direction axis, and
wherein a part of a distal end of the vibration generator is inserted into a binding groove defined in the sidewall on which the counteraction suppression plate is disposed, such that the distal end of the vibration generator is fixed in close contact with the counteraction suppression plate.

2. The camera actuator of claim 1, wherein the driving unit is includes two or more driving units, and
wherein the optical unit and the frictional movement unit include two or more optical units and two or more frictional movement units, each of the two or more optical units and frictional movement units being corresponding to a respective one of the two or more driving units.

3. The camera actuator of claim 2, wherein the two or more optical units are disposed in series at an interval in the first direction in the housing.

4. The camera actuator of claim 2, wherein the two or more driving units comprise a first driving unit and a second driving unit, a shaft of the first driving unit and a shaft of the second driving unit are parallel to each other, the first driving unit includes a first vibration generator and the second driving unit includes a second vibration generator, and the first and second vibration generators are disposed to face each other in a diagonal direction based on the first direction axis passing through centers of the two or more optical units.

5. The camera actuator of claim 2, wherein each of the two or more optical units is independently operated in the first direction by a corresponding one of the two or more driving units.

6. The camera actuator of claim 2, wherein the ball guide part comprises:
- a pair of ball rails defined on an upper surface of a bottom portion of the housing and having first ball grooves continuously defined in the first direction;
- second ball grooves defined in the first direction in lower surfaces of the two or more optical units while corresponding to the first ball grooves; and
- balls interposed between the first ball grooves and the second ball grooves, the first ball grooves and the second ball grooves being corresponding to and facing one another.

7. The camera actuator of claim 6, wherein a magnetic element is mounted on the bottom portion of the housing, and a magnet is mounted on a lower surface of the optical unit facing the bottom portion of the housing.

8. The camera actuator of claim 1, wherein the counteraction suppression plate is made of a metallic material, and a distal end surface of the vibration generator is in close contact with one surface of the counteraction suppression plate.

9. The camera actuator of claim 1, wherein the vibration generator is a piezoelectric motor comprising a piezoelectric element.

10. The camera actuator of claim 1, wherein the frictional movement unit comprises:
- the friction clamp disposed on the shaft and having a structure that surrounds a part of an outer surface of the shaft; and
- a clamp block attached to a lateral portion of the optical unit by means of a connection member, the friction clamp being mounted on the clamp block.

11. A folded zoom camera module comprising:

the camera actuator according to claim 2;

a reflection system disposed forward of the camera actuator based on a propagation direction of light and configured to reflect light introduced from an outside toward the camera actuator; and an image sensor unit disposed rearward of the camera actuator based on the propagation direction of light, the image sensor unit being configured to receive light passed through the camera actuator and to create and output image information corresponding to the received light.

* * * * *